(12) United States Patent  
Landmann (10) Patent No.: US 9,508,512 B2  
(45) Date of Patent: *Nov. 29, 2016

(54) PRESSURE SWITCH WITH TEMPERATURE ENABLE FUNCTION

(71) Applicant: KULITE SEMICONDUCTOR PRODUCTS, INC., Leonia, NJ (US)

(72) Inventor: Wolf Landmann, Fair Lawn, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/879,378

(22) Filed: Oct. 9, 2015

(65) Prior Publication Data

US 2016/0035520 A1 Feb. 4, 2016

Related U.S. Application Data

(63) Continuation of application No. 13/190,222, filed on Jul. 25, 2011, now Pat. No. 9,176,019.

(60) Provisional application No. 61/367,312, filed on Jul. 23, 2010.

(51) Int. Cl.
*H01H 35/00* (2006.01)
*H01H 35/28* (2006.01)
*G01L 19/00* (2006.01)
*G01L 19/12* (2006.01)
*B01D 35/14* (2006.01)

(52) U.S. Cl.
CPC .......... *H01H 35/28* (2013.01); *G01L 19/0092* (2013.01); *G01L 19/12* (2013.01); *B01D 35/14* (2013.01)

(58) Field of Classification Search
CPC ....................................................... H01H 35/28
See application file for complete search history.

(56) References Cited

U.S. PATENT DOCUMENTS

8,443,650 B2 5/2013 Sitabkhan et al.

*Primary Examiner* — Daniel Cavallari
(74) *Attorney, Agent, or Firm* — Troutman Sanders LLP; James E. Schutz; Mark Lehi Jones (57) ABSTRACT

The present invention describes systems and methods of providing a pressure switch with temperature enable function. An exemplary embodiment of the present invention includes a pressure sensor for providing a pressure signal having a first voltage level that is proportional to a pressure applied to the pressure sensor; a temperature sensor for providing a temperature signal having a second voltage level where the second voltage level is proportional to a temperature measured by the pressure sensor; and a control circuit for receiving the pressure signal from the pressure sensor and the temperature signal from the temperature sensor and activating a load when the first voltage level exceeds a threshold voltage level.

18 Claims, 6 Drawing Sheets

PRESSURE SWITCH WITH TEMPERATURE ENABLE FUNCTION

CROSS REFERENCE TO RELATED APPLICATION

This application is a continuation application of U.S. Non-Provisional application Ser. No. 13/190,222, entitled "Pressure Switch with Temperature Enable Function," filed 25 Jul. 2011 and published as United States Patent Publication No. US20120019308 on 26 Jan. 2012. Application Ser. No. 13/190,222 claims the benefit of U.S. Provisional Patent Application No. 61/367,312, filed 23 Jul. 2010. The entire contents and substance of each of these applications are incorporated by reference as if fully set forth below.

FIELD OF INVENTION

The present invention relates generally to pressure switches and specifically to pressure switches with a temperature enable function.

BACKGROUND

A pressure switch is a device that closes or opens an electrical contact when a pressure is above or below a certain preset pressure threshold. Pressure switches can be used in conjunction with pressure sensors, wherein the pressure sensor provides an output voltage proportional to the magnitude of an applied pressure. Pressure switches are used in a variety of different settings including manufacturing plants, automobiles, aircraft, and heavy machinery.

A sample application for a pressure switch, particularly a solid state pressure switch, is as part of a monitoring system for an oil filter. In such an application, the switch is configured to engage a circuit that powers an indicator light, or other warning system, when the differential pressure across the oil filter exceeds a predetermined threshold. Exceeding the predetermined threshold is usually an indication that the oil filter is clogged and requires replacement.

Conventional pressure switches, however, perform inadequately at low temperatures. As the temperature of oil drops it becomes more viscous. The pressure across the oil filter will be higher due to the higher viscosity of the oil. This condition can lead to false positives, where the pressure switch engages the indicator light because of high pressures, even though the oil filter is not actually clogged. As a result, perfectly useable oil filters are discarded and replaced.

Figure 1:
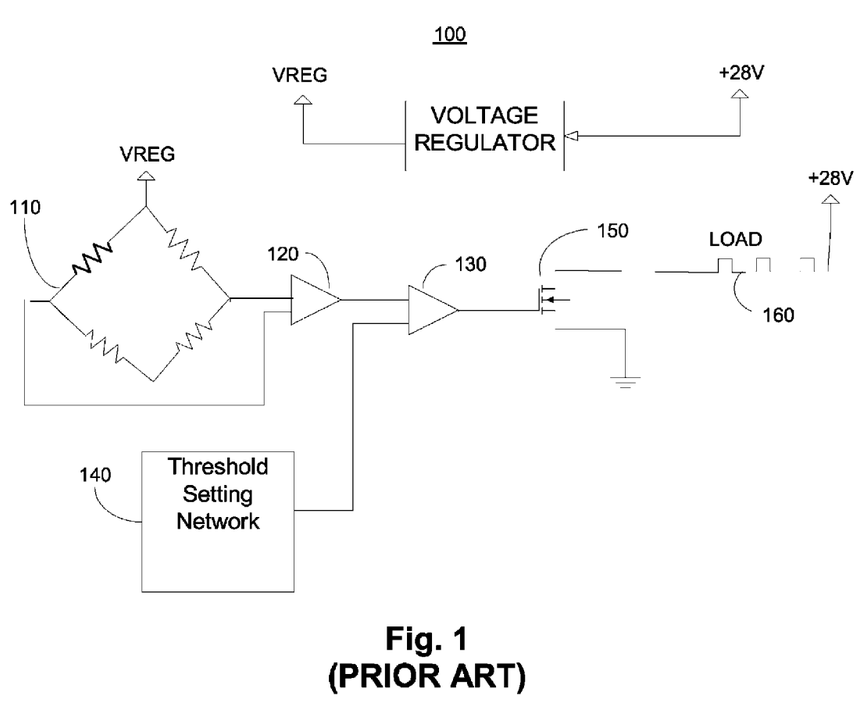
FIG. 1 illustrates a conventional pressure switch.

FIG. 1 illustrates a conventional pressure switch. A pressure sensor 110 outputs a voltage indicating the amount of pressure being measured, and that output is amplified 120. A comparator 130 compares the output of the pressure sensor against a pre-set reference voltage provided by a threshold setting network 140. The reference voltage represents a voltage level that, when exceeded by the output of the pressure sensor 110, implies that some corrective action needs to be taken. Since the conventional pressure switch makes no accounting for temperature, a drop in the temperature of the liquid being measured will lead to higher viscosity of the liquid and can cause the pressure measured by the pressure sensor 110 to exceed the reference voltage. If this scenario occurs, a warning will be triggered even though no corrective actions are necessary.

Accordingly, there is a need for a pressure switch that takes into account the temperature and corresponding viscosity of the liquid medium being measured.

BRIEF SUMMARY OF THE INVENTION

The present invention describes systems and methods of providing a pressure switch with temperature enable function. An exemplary embodiment of the present invention includes a pressure sensor for providing a pressure signal having a first voltage level that is proportional to a pressure applied to the pressure sensor; a temperature sensor for providing a temperature signal having a second voltage level where the second voltage level is proportional to a temperature measured by the pressure sensor; and a control circuit for receiving the pressure signal from the pressure sensor and the temperature signal from the temperature sensor and activating a load when the first voltage level exceeds a threshold voltage level.

An exemplary embodiment of the present invention provides a method of disabling a pressure switch using temperature that includes: measuring a pressure of an applied source; transmitting a first signal substantially indicative of the pressure of the applied source to a control circuit; measuring a temperature of the applied source; transmitting a second signal substantially indicative of the temperature of the applied source to a control circuit; and disabling a pressure switch when the control circuit determines that the temperature of the applied source is below a threshold temperature.

In addition, the present invention provides a method of disabling a pressure switch using temperature that includes: measuring a pressure of an applied source; transmitting a first signal substantially indicative of the pressure of the applied source to a control circuit; measuring a temperature of the applied source; transmitting a second signal substantially indicative of the temperature of the applied source to a control circuit; setting a pressure threshold based on the temperature of the applied source; and disabling a pressure switch when the control circuit determines that the pressure of the applied source is less than the pressure threshold, with the threshold adjusted as a function of the temperature.

DETAILED DESCRIPTION

To facilitate an understanding of the principles and features of the present invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or examples.

The elements described hereinafter as making up the invention are intended to be illustrative and not restrictive. Many suitable elements that would perform the same or similar functions as the elements described herein are intended to be embraced within the spirit and scope of the invention. Such other materials and components that are embraced but not described herein can include, without limitation, similar or analogous materials or components developed after development of the invention.

Various embodiments of the present invention are systems and methods for switching off power to a load when certain pressure and temperature thresholds are exceeded. Referring now to the figures, in which like reference numerals represent like parts throughout the views, various embodiments of the pressure switch with temperature enable function will be described in detail.

Figure 2:
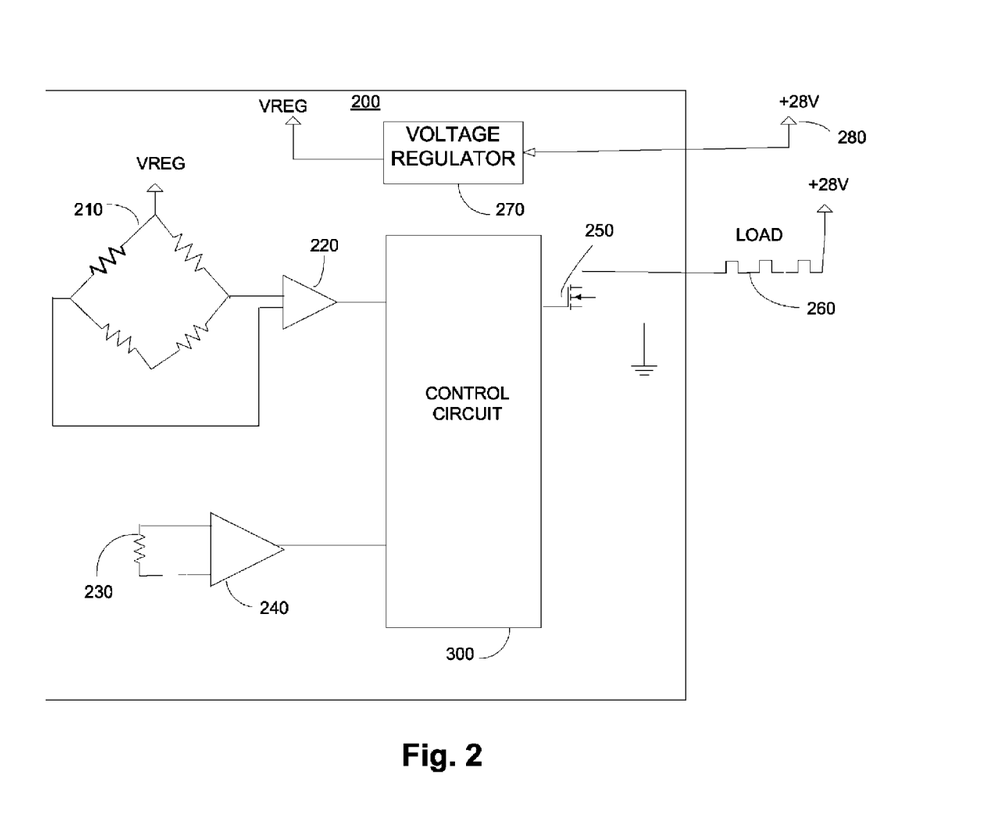
FIG. 2 illustrates a pressure switch with temperature enable function, according to an exemplary embodiment of the present invention.

FIG. 2 illustrates a block diagram of the pressure switch with temperature enable function in accordance with an exemplary embodiment of the present invention. As shown in the exemplary embodiment of FIG. 2, the pressure switch 200 can include a pressure sensor 210 and a temperature sensor 230 both connected to a control circuit 300. The sensors 210 and 230 can operate by outputting signals where the voltage levels of the signals are proportional to the magnitudes of the quantities being measured. For the pressure sensor 210, the output voltage can be proportional to the pressure applied to the pressure sensor 210 by the liquid medium being measured. For the temperature sensor 230, the output voltage level can be proportional to the ambient temperature of the liquid medium.

In an exemplary embodiment of the present invention, the control circuit 300 can receive a pressure signal from the pressure sensor 210 and a temperature signal from the temperature sensor 230 and activate a load 260 when the pressure applied to the pressure sensor exceeds a threshold. The control circuit 300 can be connected to the load 260 through a switch 250. The load 260 can be powered by a voltage source 280, while the pressure sensor 210 and the temperature sensor 230 can be powered by a voltage regulator 270 that is connected to the same voltage source 280.

In an exemplary embodiment of the present invention, the pressure sensor 210 can be configured as a Wheatstone bridge array, which is a typical sensor structure. The Wheatstone bridge has four resistors which can be piezoresistors. The resistors can be diffused or otherwise located on a thin diaphragm of silicon or other material. The diaphragm can flex upon application of a force thereto. In this manner, the resistors can be pressure sensitive and their resistances can vary according to the pressure applied to the active area of the diaphragm. Therefore, the output voltage level of the pressure sensor 210 can be proportional to the pressure applied by the liquid medium to the diaphragm. One of skill in the art will understand that the pressure sensor 210 can include other forms of transducers that convert physical pressure to an electrical signal.

It may be necessary for any signals generated by the sensors 210 and 230 to have their voltage levels boosted in order to be used by the control circuit 300. The pressure sensor 210 can have its output boosted by a pressure amplifier 220 while the temperature sensor 230 can have its output boosted by a temperature amplifier 240.

In an exemplary embodiment of the present invention, the switch 250 can be a MOSFET. The control circuit 300 can receive the output signals of the pressure sensor 210 and the temperature sensor 230 and output a control signal to the gate of the MOSFET 250. When the control signal is low, as in a logical 0, no current can flow through the MOSFET 250. When the control signal is high, as in a logical 1, current can flow from the MOSFET's 250 drain to its collector, thus powering the load 260. In a conventional pressure switch, similar to the one shown in FIG. 1, current flows through a load 160 when a threshold pressure is exceeded, and current ceases to flow when the measured pressure falls below the threshold pressure. In an exemplary embodiment of the present invention, temperature plays an additional factor in whether the load 260 is operated.

Figure 3:
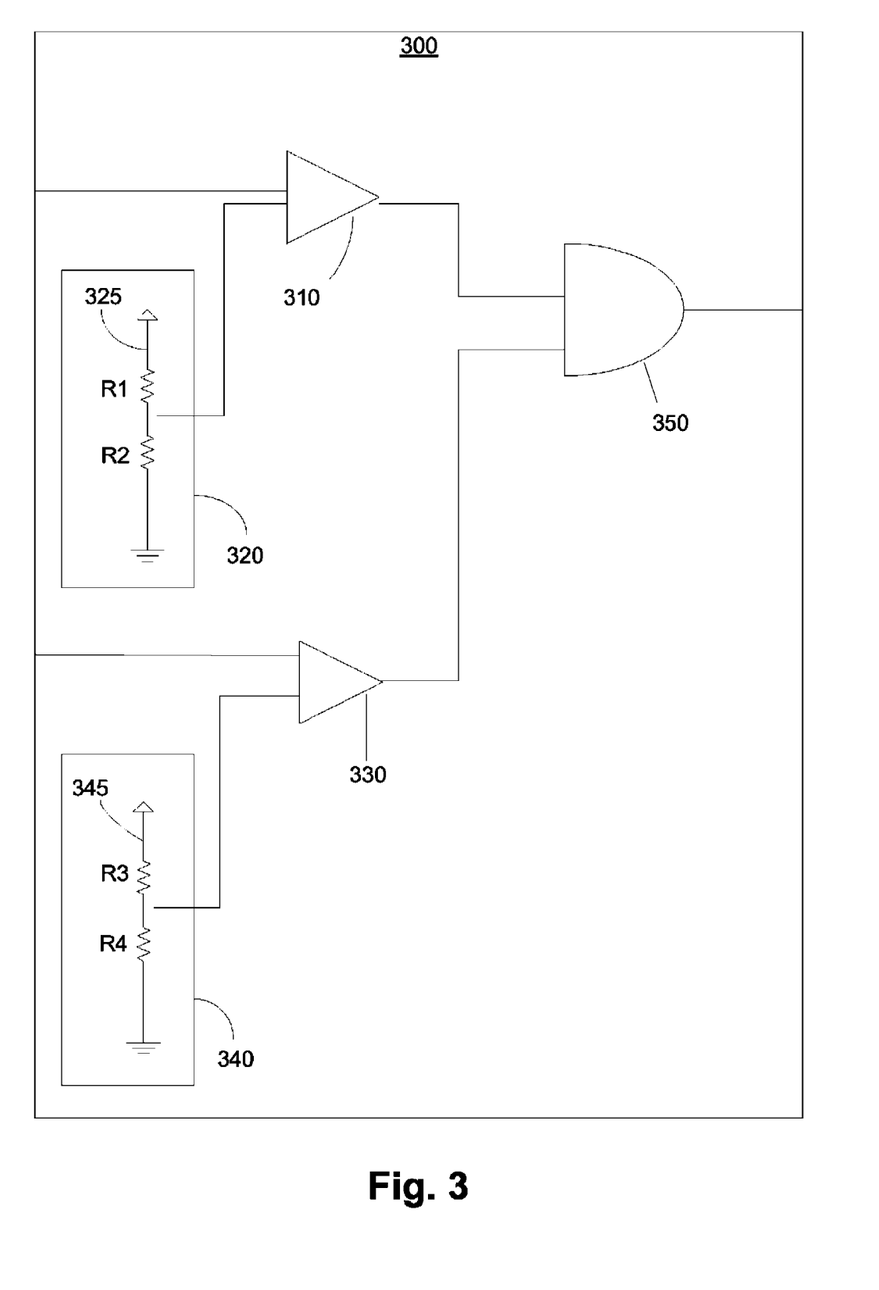
FIG. 3 illustrates a block diagram of a control circuit, according to an exemplary embodiment of the present invention.

FIG. 3 illustrates a block diagram of a control circuit 300 in accordance with an exemplary embodiment of the present invention. As shown in the exemplary embodiment of FIG. 3, the control circuit 300 can include a pressure comparator 310 and a pressure threshold setting network 320. The pressure threshold setting network 320 can establish a reference voltage level that, when exceeded by the output of the pressure sensor 210, can indicate that a threshold pressure has been exceeded. The reference voltage level can be altered as needed for a given implementation. An exemplary embodiment of the present invention can use a voltage divider 325 as the pressure threshold setting network 320 as shown in FIG. 3. In such an exemplary embodiment, the reference voltage level can be altered by changing the resistivity of the resistors R1 and R2. An exemplary embodiment of the present invention can utilize a variable resistor for one or both of R1 and R2 to alter the reference voltage level.

The pressure comparator 310 can compare the output signal of the pressure sensor 210 with the reference voltage of the pressure threshold setting network 320 and output a pressure indicator signal to indicate whether the measured pressure of the liquid medium has exceeded a threshold value. The pressure indicator signal can be high when the voltage level of the pressure sensor output signal exceeds the reference voltage level and low otherwise.

The control circuit 300 in an exemplary embodiment of the invention as shown in FIG. 3 can also include a temperature comparator 330 and a temperature threshold setting network 340. The temperature threshold setting network 340 can establish a reference voltage level that, when exceeded by the output of the temperature sensor 230, can indicate that a threshold temperature has been exceeded. The reference voltage level can be altered as needed for a given implementation. An exemplary embodiment of the present invention can use a voltage divider 345 as the temperature threshold setting network 340 as shown in FIG. 3. In such an exemplary embodiment, the reference voltage level can be altered by changing the resistivity of the resistors R3 and R4. An exemplary embodiment of the present invention can utilize a variable resistor for one or both of R3 and R4 to alter the reference voltage level. The temperature comparator 330 can compare the output signal of the temperature sensor 230 with the reference voltage of the temperature threshold setting network 340 and output a temperature indicator signal to indicate whether the measured temperature of the liquid medium has exceeded a threshold value. The temperature indicator signal can be high when the voltage level of the temperature sensor output signal exceeds the reference voltage level and low otherwise.

The control circuit 300 in an exemplary embodiment of the present invention can include an AND gate 350. The AND gate 350 can perform a logical AND operation using the temperature indicator signal and the pressure indicator signal as inputs. The output of the AND gate 350 will be a high signal when both indicator signal inputs are high, and a low signal otherwise.

In an exemplary embodiment, a pressure switch with a temperature enable function 200 can reduce equipment downtime by preventing the false alarms associated with low temperatures. In an exemplary embodiment, the present invention can extend the average lifetime of components by reducing the premature replacement of parts, thus lowering the associated replacement costs.

Figure 4:
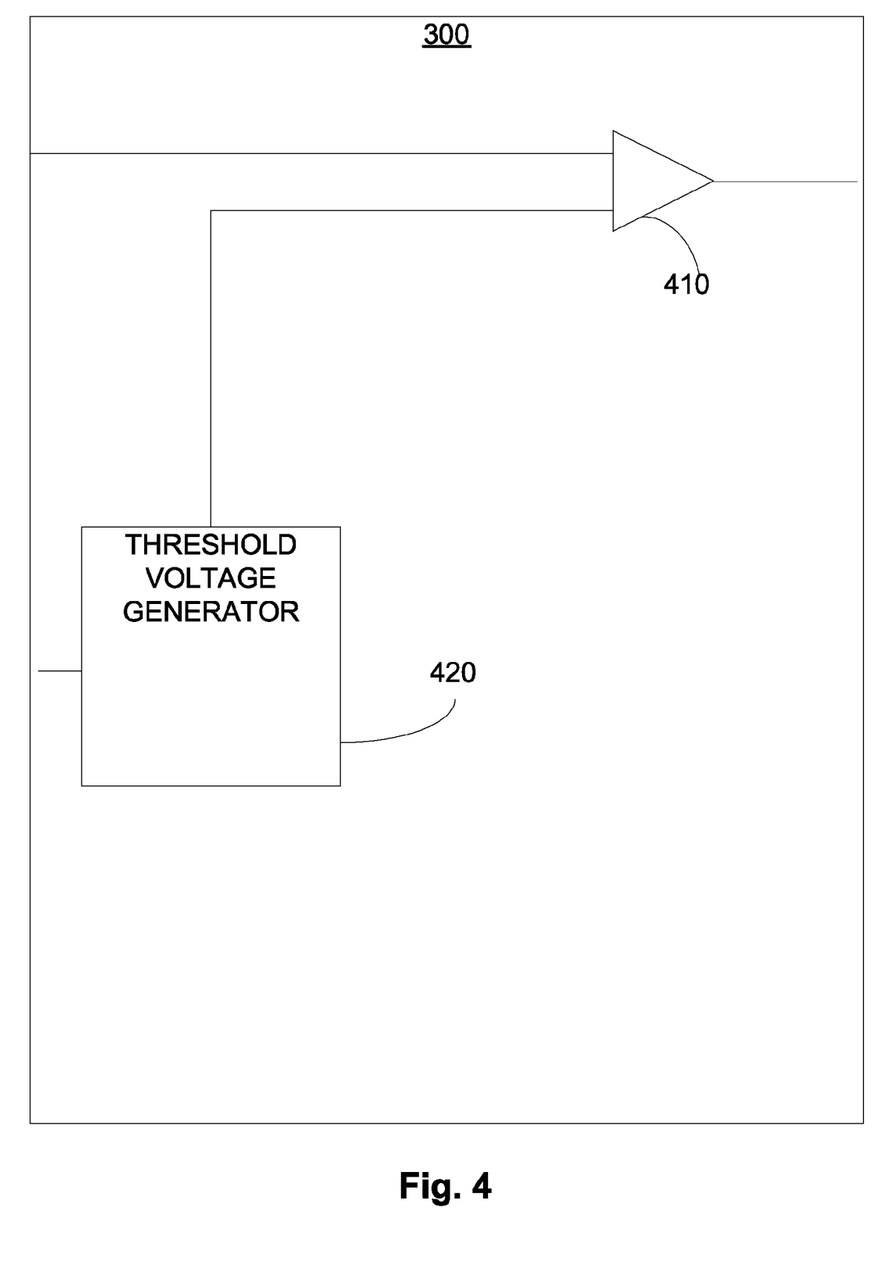
FIG. 4 illustrates a block diagram of a control circuit, according to an exemplary embodiment of the present invention.

FIG. 4 illustrates a control circuit 300 in accordance with an exemplary embodiment of the invention. As shown in the exemplary embodiment of FIG. 4, the control circuit 300 can include a pressure comparator 410 and a threshold voltage generator 420. The threshold voltage generator 420 can apply a function that takes into account the relationship between the temperature and the viscosity of the fluid medium to establish a reference pressure. The threshold voltage generator 420 can receive the temperature signal as input from the temperature sensor 230 and output a reference voltage level.

The output of the threshold voltage generator 420 and the pressure sensor output can be the inputs to a pressure comparator 410. The pressure comparator 410 can compare the voltage level of the pressure sensor signal to the reference pressure voltage level. When the voltage level of the pressure sensor signal is higher than the reference pressure voltage level, the pressure comparator 410 can output a high signal. When the voltage level of the pressure sensor signal is lower, the pressure comparator 410 can output a low signal.

An exemplary embodiment of a pressure switch with a temperature enable function 200 can enable more productive use of sensitive machinery. By preventing downtime due to the false positives caused by low temperatures, equipment utilizing an exemplary embodiment of the present invention can be operated across a broader range of temperatures than allowed for by most conventional pressure switches. An exemplary embodiment of a pressure switch with a temperature enable function 200 can allow sensitive equipment, which can be damaged when operated in high pressure conditions, to be operated across a broader range of temperatures than allowed for by most conventional pressure switches. Downtime due to the false positives caused by low temperatures can be avoided, while still allowing the equipment to indicate when critical pressure levels have been exceeded.

Figure 5:
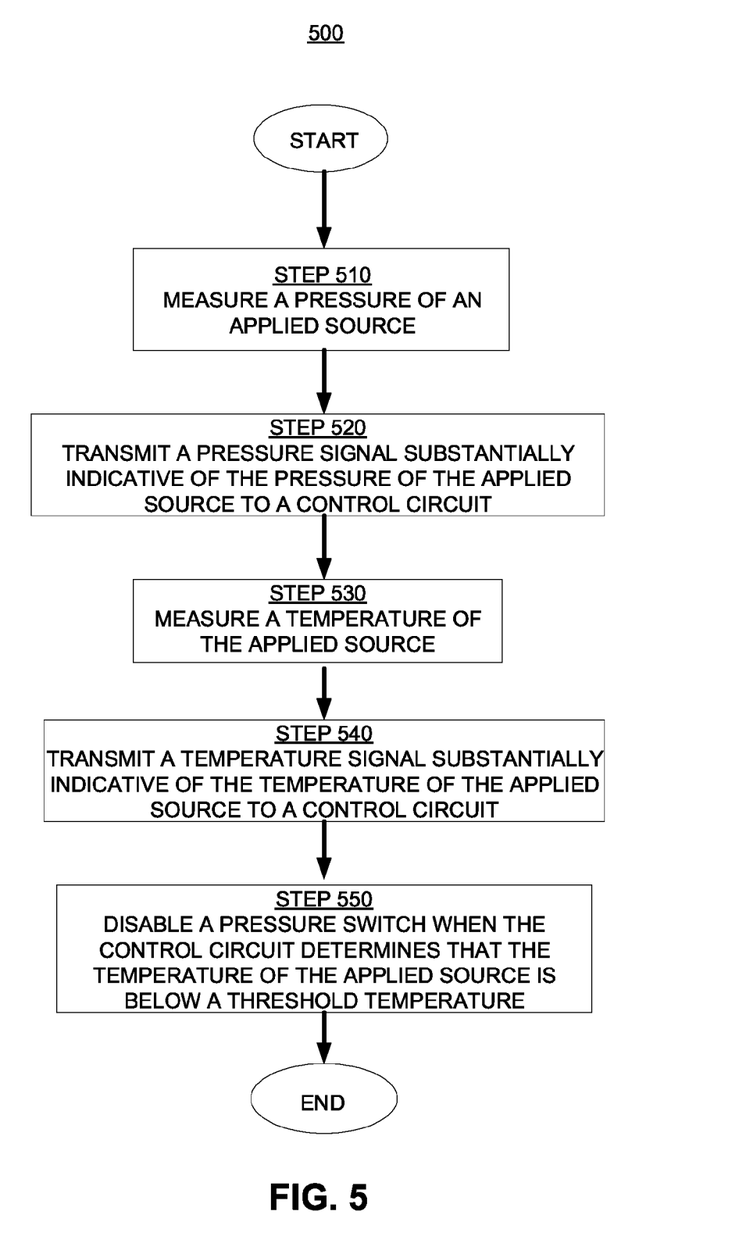
FIG. 5 illustrates a method for providing a pressure switch with temperature enable function, according to an exemplary embodiment of the present invention.

FIG. 5 is an illustration of a method for providing a pressure switch with a temperature enable function 500. A pressure switch can allow current to flow through a load when a measured pressure exceeds a pressure threshold. The first step 510 of an exemplary embodiment of the invention can involve measuring the pressure exerted by an applied source, for example, a liquid medium. In an exemplary embodiment of the present invention, the measured pressure can be the pressure the liquid medium exerts on a surface. The next step 520 in an exemplary embodiment of the present invention can involve transmitting a pressure signal to a control circuit that is substantially indicative of the pressure of the liquid medium. In some exemplary embodiments, the pressure signal can have a voltage level that is proportional to the pressure exerted by the liquid medium. In some exemplary embodiments, the voltage level of the pressure signal can be amplified to facilitate detection by the control circuit 300. The next step 530 in an exemplary embodiment of the present invention can involve measuring the temperature of the liquid medium. The next step 540 in an exemplary embodiment of the present invention can involve transmitting a temperature signal to the control circuit that is substantially indicative of the temperature of the liquid medium. In an exemplary embodiment, the temperature signal can have a voltage level that is proportional to the temperature of the liquid medium. In an exemplary embodiment, the voltage level of the temperature signal can be amplified to facilitate detection by the control circuit. The next step 550 in an exemplary embodiment of the present invention can involve disabling a pressure switch when the control circuit 300 determines that the temperature of the applied source is below a threshold temperature. In an exemplary embodiment, one or both of the threshold temperature or the threshold pressure can be adjusted.

Figure 6:
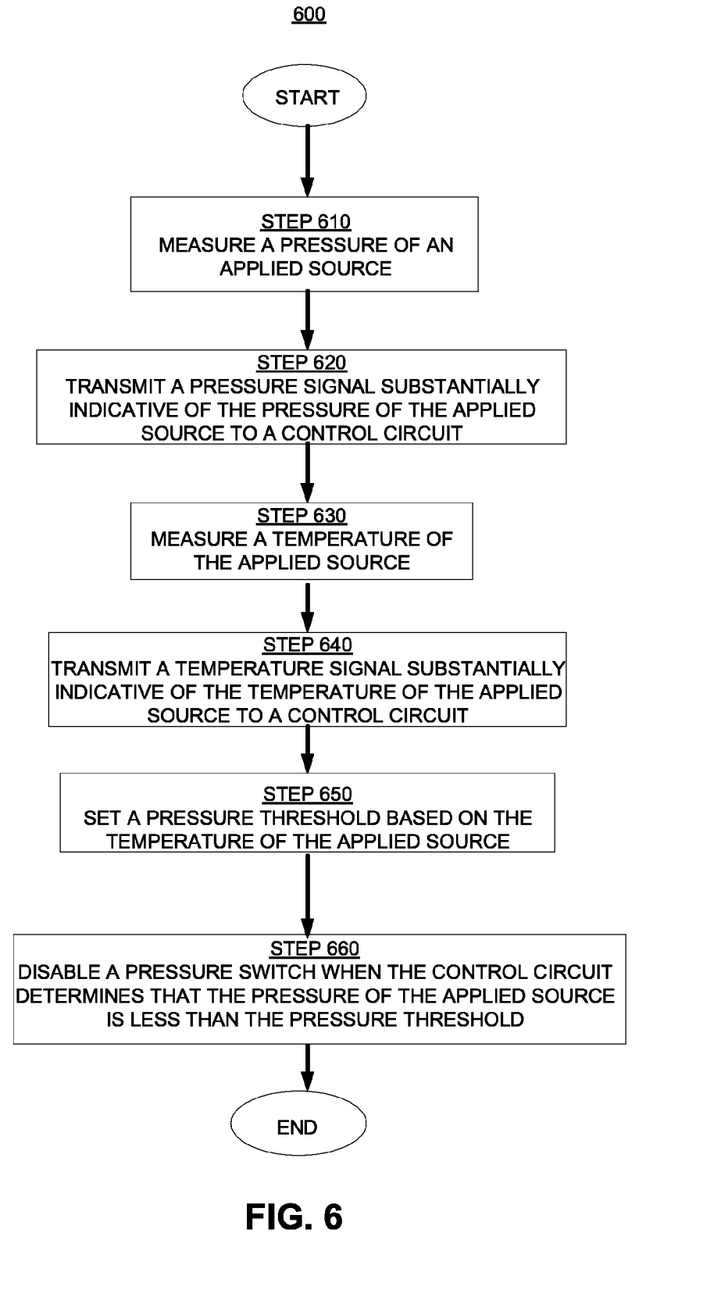
FIG. 6 illustrates a method for providing a pressure switch with temperature enable function, according to an exemplary embodiment of the present invention.

FIG. 6 is an illustration of a method for providing a pressure switch with a temperature enable function 600. The first step 610 of an exemplary embodiment of the present invention can involve measuring the pressure of the applied source, for example, a liquid medium. In an exemplary embodiment of the present invention, the measured pressure can be the pressure the liquid medium exerts on a surface. The next step 620 can involve transmitting a pressure signal to a control circuit 300 that is substantially indicative of the pressure of the liquid medium. In some exemplary embodiments, the pressure signal can have a voltage level that is proportional to the pressure exerted by the liquid medium. In some exemplary embodiments, the voltage level of the pressure signal can be amplified to facilitate detection by the control circuit. The next step 630 in an exemplary embodiment of the present invention can involve measuring the temperature of the liquid medium. The next step 640 in an exemplary embodiment of the present invention can involve transmitting a temperature signal to the control circuit 300 that is substantially indicative of the temperature of the liquid medium. In some exemplary embodiments, the temperature signal can have a voltage level that is proportional to the temperature of the liquid medium. In some exemplary embodiments, the voltage level of the pressure signal can be amplified to facilitate detection by the control circuit 300. The next step 650 in an exemplary embodiment of the present invention can involve setting a pressure threshold based on the temperature of the applied source. For a given liquid, there is a known relationship between the liquid's temperature and the liquid's viscosity. The viscosity of the liquid is proportionally related to the force the liquid can exert as it flows across a surface or through a membrane. In an exemplary embodiment of the present invention, the pressure threshold can be set according to the pressure the liquid medium can be expected to exert at a given temperature based on the liquid's viscosity at the given temperature. The next step in an exemplary embodiment of the present invention can involve disabling a pressure switch when the control circuit 300 determines that the pressure of the applied source is less than the pressure threshold, with the threshold adjusted as a function of the temperature.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. A control circuit comprising:
   a pressure comparator configured to receive a pressure signal from a pressure sensor and a pressure reference voltage, the pressure comparator further configured to output a pressure output signal responsive to a comparison of the pressure signal and the pressure reference voltage;
a temperature comparator configured to receive a temperature signal from a temperature sensor and a temperature reference voltage, the temperature comparator configured to output a temperature output signal responsive to a comparison of the temperature signal and the temperature reference voltage; and
a logic circuit in communication with the pressure comparator and the temperature comparator, the logic circuit configured to output an activating signal to a load in communication with the logic circuit responsive to the pressure output signal and the temperature output signal.

2. The control circuit of claim 1, wherein the pressure sensor is configured to output, responsive to an applied pressure, the pressure signal indicative of the applied pressure.

3. The control circuit of claim 1, wherein the temperature sensor is configured to output, responsive to a measured temperature, the temperature signal indicative of the measured temperature.

4. The control circuit of claim 1, further comprising a pressure signal amplifier for selectively amplifying the pressure signal.

5. The control circuit of claim 1, further comprising a temperature signal amplifier for selectively amplifying the temperature signal.

6. The control circuit of claim 1, wherein the logic circuit is configured to output the activating signal to the load responsive to one or more of the temperature signal exceeding the temperature reference voltage and the pressure signal exceeding the pressure reference voltage.

7. The control circuit of claim 1, wherein the logic circuit comprises an AND gate coupled to the pressure comparator and the temperature comparator, the AND gate configured to produce an AND gate output that activates the load when both the temperature comparator output and the pressure comparator output are high.

8. The control circuit of claim 7, further comprising a first MOSFET having a gate, a source, and a drain wherein the gate receives the AND gate output, wherein the drain is coupled to a load, and the collector is coupled to a reference potential and wherein the first MOSFET allows current to flow to the load when the AND gate output is high.

9. The control circuit of claim 1, further comprising a pressure reference circuit configured to output the pressure reference voltage, wherein the pressure reference circuit comprises a first voltage divider.

10. The control circuit of claim 1, further comprising a temperature reference circuit configured to output the temperature reference voltage, wherein the temperature-reference circuit comprises a second voltage divider.

11. The control circuit of claim 1, further comprising:
a threshold voltage generator for receiving the temperature signal and configured to output a third reference voltage level, wherein the third reference voltage level is indicative of a pressure that is expected to be exerted by a liquid medium at the temperature measured by the temperature sensor; and
a second pressure comparator for receiving the pressure signal from the pressure sensor and the third reference voltage level from the threshold voltage generator, the second pressure comparator configured to produce a second pressure comparator output configured to activate the load when the pressure signal exceeds the third reference voltage level.

12. The control circuit of claim 11, further comprising a second MOSFET having a gate, a source, and a drain wherein the gate receives the second pressure comparator output, wherein the drain is coupled to the load, and the collector is coupled to a reference potential and wherein the second MOSFET allows current to flow through the load when the second pressure comparator output is high.

13. A method, comprising:
receiving, by a pressure comparator and from a pressure sensor, a pressure signal;
receiving, by the pressure comparator, a pressure reference voltage;
outputting, by the pressure comparator, a pressure output signal responsive to a comparison of the pressure signal and the pressure reference voltage;
receiving, by a temperature comparator and from a temperature sensor, a temperature signal;
receiving, by the temperature comparator, a temperature reference voltage;
outputting, by the temperature comparator, a temperature output signal responsive to a comparison of the temperature signal and the temperature reference voltage;
receiving, by a logic circuit in communication with the pressure comparator and the temperature comparator, the pressure output signal and the temperature output signal; and
outputting, by the logic circuit, an activating signal configured to activate a load in communication with the logic circuit responsive to the pressure output signal and the temperature output signal.

14. The method of claim 13, further comprising selectively amplifying one or more of the pressure signal and the temperature signal.

15. The method of claim 13, wherein outputting the activating signal is responsive to one or more of the temperature signal exceeding the temperature reference voltage and the pressure signal exceeding the pressure reference voltage.

16. The method of claim 13, further comprising:
receiving, by a threshold generator, the temperature signal;
generating, by the threshold generator, and based at least in part on the temperature signal, a third reference voltage, wherein the third reference voltage level is indicative of a pressure that is expected to be exerted by a liquid medium at a temperature measured by the temperature sensor;
receiving, by a second pressure comparator, the pressure signal from the pressure sensor and the third reference voltage level from the threshold voltage generator; and
outputting, by the second pressure comparator, an output signal configured to activate the load when the pressure signal exceeds the third reference voltage level.

17. The method of claim 13, further comprising:
setting the pressure reference voltage to correspond to a pressure threshold voltage based the temperature signal;
comparing the pressure signal and the pressure reference voltage; and
outputting a load activation signal responsive to the comparing.

18. The method of claim 17, wherein setting the pressure threshold voltage further comprises setting a pressure threshold that corresponds to a pressure expected to be exerted by a liquid medium when the liquid medium is at a measured temperature.

\* \* \* \* \*